April 7, 1931.          G. RÉMILLARD          1,799,642

FURROW OPENER

Filed July 22, 1929

INVENTOR:-
George Rémillard
BY
Louis H. Carreau
ATTORNEY

Patented Apr. 7, 1931

1,799,642

UNITED STATES PATENT OFFICE

GEORGE RÉMILLARD, OF ST. JOHN'S, QUEBEC, CANADA

FURROW OPENER

Application filed July 22, 1929. Serial No. 379,992.

This invention relates to a furrow opener, and has for its prime object the provision of means whereby the cross section of the furrow may be altered.

This invention can be applied to cultivators and transplanting machines generally, but was developed principally for tomato planting.

Another object is to so construct the device that it may be put together, taken apart, or adjusted for varying the shape of the furrow, in a minimum of time and with the minimum of trouble, while being strong and durable; other objects will appear as the specification is read in the light of the drawings.

In the drawings.

Like numerals of reference indicate corresponding parts in the various figures.

Referring by numerals to the drawings, my device consists essentially of a tooth 10 fixed to a shank 11 depending from the machine (not shown), and two wings 12 adjustable vertically on the shank to vary the cross section of the furrow.

The shank 11 depends from the machine, and more particularly from some movable member capable of lowering or raising same so to vary the depth to which the furrow is to be cut into the ground. To the shank is secured the tooth 10, as with a bolt 13, the purpose being to start the furrow or cut a portion of it.

The wings 12, shaped substantially as shown, are arranged at an angle to scatter the earth sideways and widen the furrow above the tooth 10. By altering the position of the wings relatively to the tooth, the cross section of the furrow is correspondingly altered.

Figure 1:
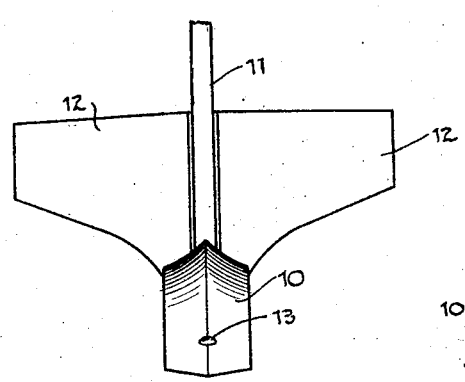
Figure 1 is a front elevation of my device, showing shank broken away.
Figure 2:
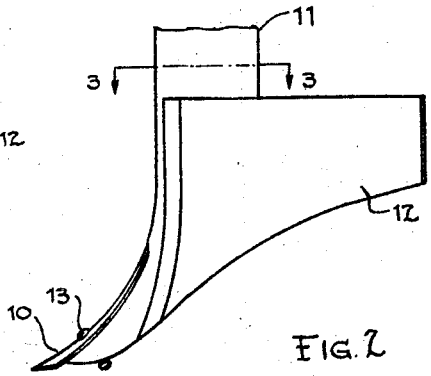
Figure 2 is a side elevation of Figure 1.
Figure 4:
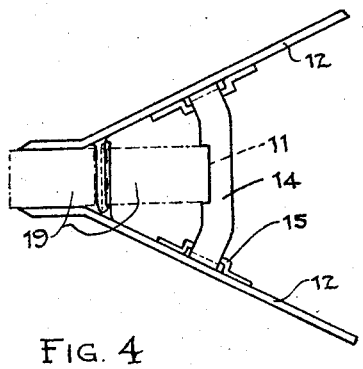
Figure 4 is an enlarged fragmentary view of Figure 3, showing the shank in dot and dash lines.
Figure 3:
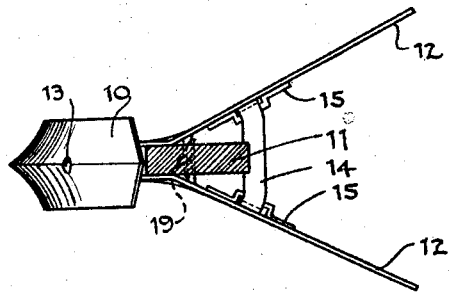
Figure 3 is a section view taken on line 3—3 in Figure 2.
Figure 5:
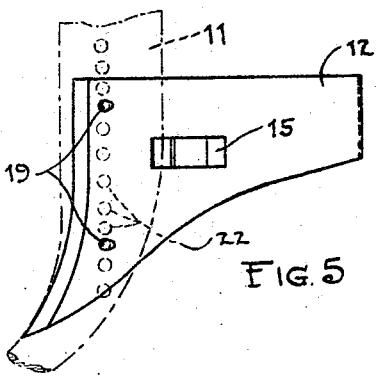
Figure 5 is an inside side elevation of one of the wings, showing a portion of the shank in dot and dash lines.

In the drawings I have shown two different means of adjustably securing the wings to the shank, that shown in Figures 3, 4 and 5 being the most satisfactory in that very little trouble is incurred in adjusting the wings and a great deal of time and labor is accordingly saved.

Referring first to the preferred means, namely that shown in Figures 3, 4 and 5, a pair of metal prongs or tits 19 extending from the inside face of each of the wings, are formed to engage in or hook into correspondingly spaced holes 22 made through the shank; the tits are preferably curved slightly at their ends (see Figure 4) to better hold on to the shank; these tits may be welded to the wings in such a way as not to project outside their plowing or furrowing faces; the wings are further secured together and retained in spaced relation by a removable spacing member 14 having hook ends 17 engaging in pockets or brackets 15 welded to the inside faces of the wings, and to retain the wings in fixed relation relatively to the shank and to otherwise provide rigidly mounted wings, the spacer is notched as at 16 to engage the inner and side edges of the shank; preferably the wings are so shaped and sized and the brackets 15 so spaced that more pressure bears upon the part of the wings forwardly of the brackets than on the part rearwardly of the brackets, thus obviating any tendency of the wings to turn inwardly around the brackets and cause the tits to disengage from the holes, although any such turning may be checked by making the member 14 to a fairly large cross section. The tits 19 are staggered on the two wings so that the wings may lie at a same elevation and the tits engage in the vertically-arranged holes 22, notwithstanding that the tits in Figure 4 are not shown as being in vertical alignment, owing to the difficulty of clearly indicating one tit under the other.

Figure 6:
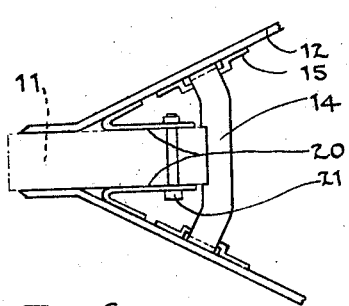
Figure 6 is a fragmentary top plan view showing a modification in the construction of the wings and more particularly in the means for securing the same to the shank.
Figure 7:
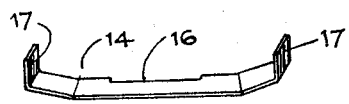
Figure 7 is a perspective view of the wing spacing member.

The modification in the means of securing the wings to the shank, as shown in Figure 6 consists in welding a pair of brackets 20 to each of the wings and attaching the brackets to the shank by means of a bolt 21, and using a spacer 14 and brackets 15. While this means is satisfactory, in that the wings are firmly retained in position, still considerable time is consumed in removing the two bolts, and the advantage of the preferred means becomes at once evident.

Operation

In altering the position of the wings 12 on the shank so as to alter the cross section or shape of the furrow, the spacer 14 is first removed by lifting, and the wings then removed by pulling outwardly. To adjust the wings in a different position, the wings are in turn fastened on to the shank, by causing the prongs to engage in the holes corresponding to the required height to which the wings are to be positioned, and the spacer 14 placed back into position.

What I claim as my invention is:

1. In a furrow opener, a shank having spaced holes therethrough, a tooth secured to said shank, a pair of wings having prongs adapted to removably engage in the holes in said shank, and a spacer removably secured to said wings and having a notch formed to engage a portion of the cross sectional periphery of said shank.

2. In a furrow opener, a shank having spaced holes therethrough, a tooth secured to said shank, a pair of wings having prongs on the one arranged to be in staggered relation to the prongs on the other wing so that the wings may be secured at a same elevation with respect to said tooth, and a spacer having a notch formed to engage a portion of the cross sectional periphery of said shank.

Signed at the city of St. John's, Quebec, this 6th day of June, 1929.

GEORGE RÉMILLARD.